United States Patent
Kim et al.

(10) Patent No.: US 6,226,660 B1
(45) Date of Patent: May 1, 2001

(54) EFFICIENT METHOD OF IMPLEMENTING RANDOM NUMBER GENERATORS

(75) Inventors: Jong Bae Kim, Daejon-Shi; Hyeong Cheol Oh, Chungchongnam-Do; Goo Young Park, Kyonggi-Do, all of (KR)

(73) Assignee: Electronics and Telecommunications Research Institute, Daejon (KR)

(*) Notice: Subject to any disclaimer, the term of this patent is extended or adjusted under 35 U.S.C. 154(b) by 0 days.

(21) Appl. No.: 09/148,899

(22) Filed: Sep. 8, 1998

(30) Foreign Application Priority Data

Dec. 27, 1997 (KR) .................................................. 97-75368

(51) Int. Cl.[7] ...................................................... G06F 1/02
(52) U.S. Cl. ................................................................ 708/250
(58) Field of Search ............................... 708/250–256

(56) References Cited

U.S. PATENT DOCUMENTS

| | | | |
|---|---|---|---|
| 5,187,676 | 2/1993 | DeVane | 708/251 |
| 5,325,201 | 6/1994 | Herz | 708/250 |
| 5,596,516 * | 1/1997 | Higashi et al. | 708/250 |
| 5,872,725 * | 2/1999 | Ninomiya et al. | 708/250 |
| 6,097,815 * | 8/2000 | Shimada | 708/252 |

OTHER PUBLICATIONS

A.P. Paplinski et al., "Hardware implementation of the Lehmer random number generator", IEEE, Jan. 1996, pp. 93–95.

* cited by examiner

*Primary Examiner*—David H. Malzahn
(74) *Attorney, Agent, or Firm*—Jacobson, Price, Holman & Stern, PLLC

(57) ABSTRACT

The present invention provides a method of implementing random number generators, which makes efficient hardware implementations possible, in a way of converting the multiplication and addition operations and the modulo operations into a series of addition operations.

1 Claim, 3 Drawing Sheets

EFFICIENT METHOD OF IMPLEMENTING RANDOM NUMBER GENERATORS

BACKGROUND OF THE INVENTION

1. Field of the Invention

The present invention relates to the implementation schemes of random number generators. In particular, the present invention relates to an efficient method of implementing random number generators with the period $2^m+1$.

2. Description of the Prior Art

Random number generators are widely used in various fields such as programming, network management, etc. These random number generators are implemented using software in most cases. In the field using ultra-high arithmetic operations such as network management, however, a hardware implementation is required since the processing speed is important.

SUMMARY OF THE INVENTION

It is an object of the present invention to solve the problems involved in the prior art, and to provide an efficient method of implementing random number generators, in the sense that the implemented generators can generate random numbers in shorter time, using less hardware. The present invention considers the generators with the period $2^m+1$, which is the case that the existing methods are difficult to be applied.

In order to achieve the above object, the method of efficiently implementing the random number generators, according to the present invention, consists of the steps of: performing a series of matrix operations for implementing the modulo operations; performing a matrix subtraction using binary subtractions, reducing 1 from the lowest bit of the minuend, and adding 1 to the highest bit of the minuend for each row of the respective matrices to produce a 7×19 matrix; and adding to the 7×19 matrix the value obtained by adding 7 to the constant c to produce a 8×19 matrix.

BRIEF DESCRIPTION OF THE DRAWINGS

For more understanding of the nature and object of the invention, reference should contain the following detailed descriptions taken in conjunction with the accompanying drawings. The above object, other features, and advantages of the present invention will become more apparent by describing the preferred implementation thereof with reference to the accompanying drawings, in which.

Similar reference characters refer to similar parts in the several views of the drawings.

DETAILED DESCRIPTION OF PREFERRED IMPLEMENTATIONS

Below, the present invention will be explained in detail by reference to the accompanying drawings.

Figure 1:
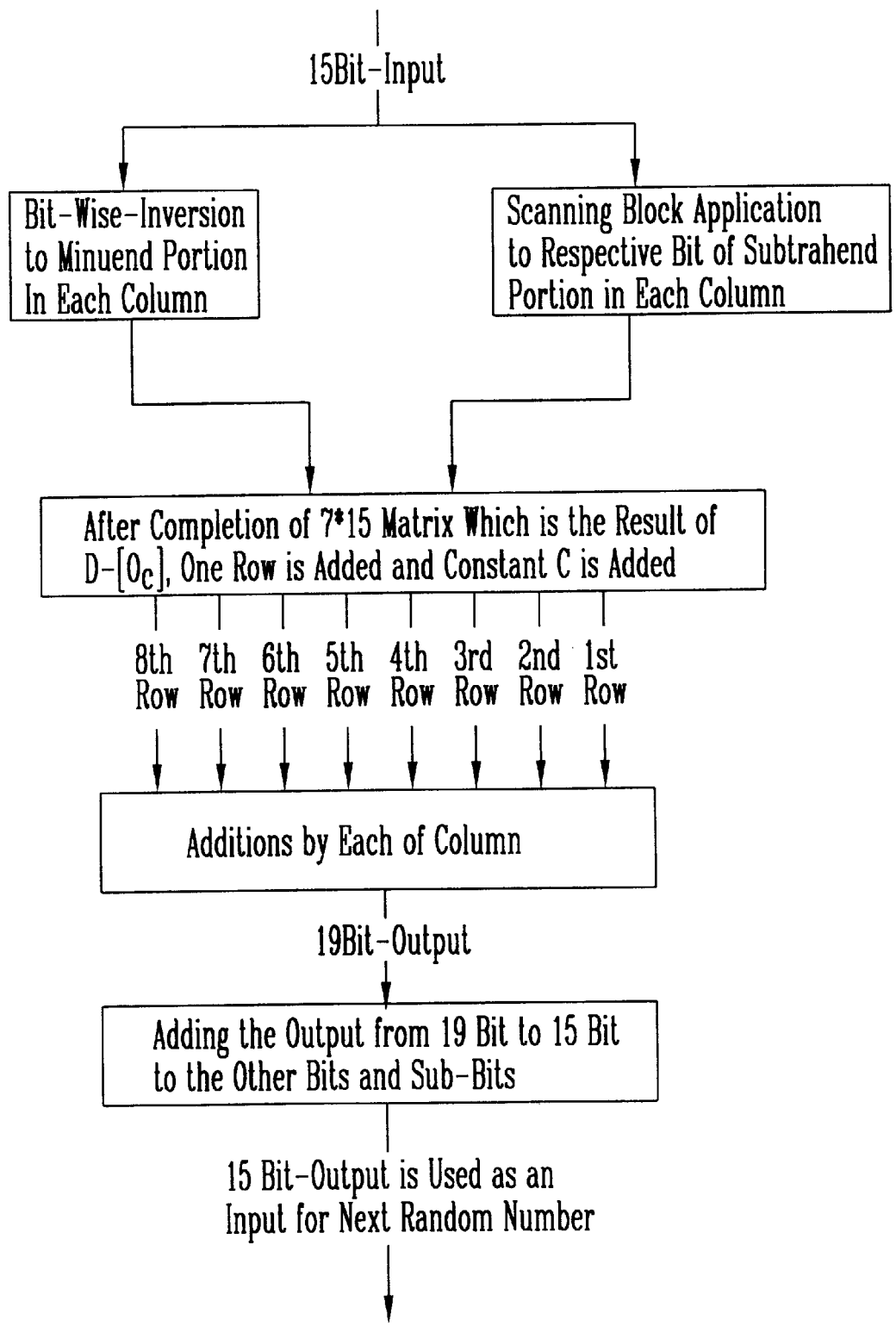
FIG. 1 is an overall block diagram in designing a random number generator.
Figure 2:
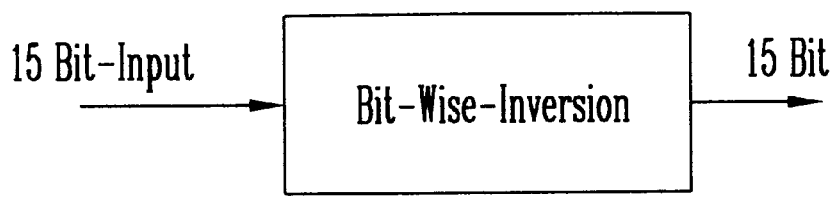
FIG. 2 is a design drawing which is applicable to the subtrahend portion.

FIG. 1 is an overall block diagram in designing a random number generator,

FIG. 2 is a design drawing which is applicable to the subtrahend portion, and

Figure 3:
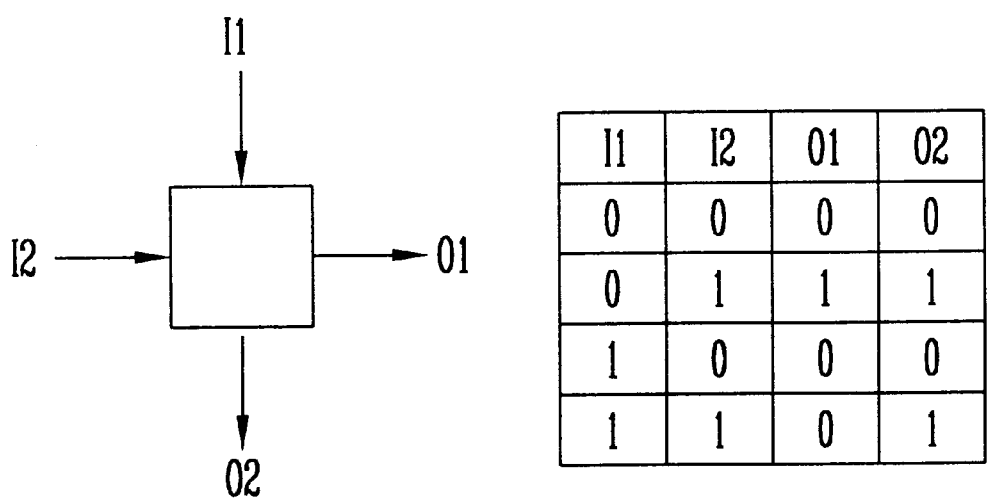
FIG. 3 is a design drawing which is applicable to the minuend portion.

FIG. 3 is a design drawing which is applicable to the minuend portion.

A mixed-type random number generator may be expressed into a function of using the equation 1:

$$r=f(z)=(a \cdot z+c) \bmod M, \quad \text{[Equation 1]}$$

where, $z \in 1, 2, \ldots, M-1$

Random numbers r generated from the equation 1 can be rewritten as follows so as to produce next random numbers:

$$z(n+1)=f(z(n)), \quad \text{[Equation 2]}$$

where $n=1, 2, \ldots$

Let a and z in the equation 1 express binary numbers and w express figure numbers, it can be expressed using the following example.

Let $a=10924$ ($a13:0=101010101100$), $c=101110001010$, then a binary multiplication of a and z can be expressed into the equation 3 as follows:

[Equation 3]

$$
\begin{array}{c}
\phantom{x)} \quad z_{14} \; z_{13} \; z_{12} \; \cdots \; z_7 \; z_6 \; \cdots \; z_1 \; z_0 \\
x) \quad \phantom{z_{14} \; z_{13} \; z_{12} \; \cdots} a_{13} \; a_{12} \; \cdots \; a_7 \; a_6 \; \cdots \; a_1 \; a_0 \\
\hline
z_{14} \; z_{13} \; z_{12} \; z_{11} \; z_{10} \; \cdots \; z_1 \; z_0 \; 0 \; 0 = Y1 \\
z_{14} \; z_{13} \; z_{12} \; z_{11} \; z_{10} \; \cdots \; z_1 \; z_0 \; 0 \; 0 \; 0 = Y2 \\
\cdots \\
+) \; z_{14} \; z_{13} \; \cdots \; z_0 \; 0 \; 0 \; 0 \; \cdots \; 0 \; 0 = Y7
\end{array}
$$

Wherein, in order to produce 7×28 matrix, let Y column. Then it can be expressed into the equation 4 as follows.

[Equation 4]

$$
\begin{bmatrix} Y7 \\ \vdots \\ Y2 \\ Y1 \end{bmatrix} =
\begin{bmatrix}
z_{14} & z_{13} & \cdots & \cdots & z_1 & z_0 & 0 & \cdots & 0 & 0 & 0 & 0 & 0 \\
\cdots & \cdots & \cdots & \cdots & \cdots & \cdots & \cdots & & & & & & \\
& & z_{14} & z_{13} & z_{12} & z_{11} & z_{10} & \cdots & z_1 & z_0 & 0 & 0 & 0 \\
& & & z_{14} & z_{13} & z_{12} & z_{11} & \cdots & \cdots & z_1 & z_0 & 0 & 0
\end{bmatrix}
$$

Let $<Y>=[Y_7 Y_6 Y_5 Y_4 Y_3 Y_2 Y_1]^T$. Then $a \cdot z = [1111111] \cdot <Y> \cdot w_{27:0}$, and $$<Y> \cdot w_{27:0} = C \cdot w_{12:0} \cdot 2^{15} + D \cdot w_{14:0} = C \cdot w_{12:0} \cdot 2^{15} + C \cdot w_{12:0} - C \cdot w_{12:0} +$$
$$D \cdot w_{14:0} = (C \cdot w_{12:0}) \cdot M - C \cdot w_{12:0} + D \cdot w_{14:0} \quad \text{[Equation 5]}$$

Wherein, $M=2^{15}+1$. Therefore, $a\cdot z \bmod (2^{15}+1)$ may be expressed into the following equation 6:

$$a\cdot z \bmod M = [1111111]\cdot(D\cdot w_{14:0} - C\cdot w_{12:0})$$

$$= [1111111]\cdot(D-[0C])\cdot w_{14:0} \quad \text{[Equation 6]}$$

The equation 6 requires a subtraction operation of the matrices and may be expressed into the following equation 7:

$$D - [0 \ C] \quad \text{[Equation 7]}$$

$$\begin{vmatrix} z_1 & z_0 & 0 & \cdots & \cdots & \cdots & \cdots & \cdots \\ \cdots & \cdots & \cdots & \cdots & \cdots & \cdots & \cdots & \cdots \\ z_{11} & z_{10} & \cdots & z_1 & z_0 & \cdots & \cdots & \cdots \\ z_{12} & z_{11} & \cdots & z_2 & z_1 & z_0 & 0 & 0 \end{vmatrix} +$$

$$\begin{vmatrix} 0 & 0 & -z_{14} & -z_{13} & \cdots & \cdots & -z_3 & -z_2 \\ \cdots & \cdots & \cdots & \cdots & \cdots & \cdots & \cdots & \cdots \\ 0 & \cdots & \cdots & \cdots & 0 & -z_{14} & -z_{13} & -z_{12} \\ 0 & & & & & 0 & -z_{14} & -z_{12} \end{vmatrix}$$

There are two methods for implementing the matrix equation of [Equation 7] into hardware.

First, addition is performed on the basis of column for respective matrices and the results therefrom are then added again. However, since this method causes lots of delay time in the process of adding the results again, the present invention first performs the subtraction of the matrix using an efficient method so as to reduce this delay time. Then it performs the addition for a single matrix obtained therefrom on the basis of column. When the present invention is employed, reduction in the delay time can be obtained since the process of adding the differently generated results can be omitted unlike the existing methods.

In order to perform a 2's complement subtraction for each row of the matrix, it was applied up to the highest column at which $z0$ is located in the block shown in FIG. 3, in case of the minuend portion and used a bit-wise inversion against the subtrahend portion. In the matrix subtraction of the [Equation 7], zeros are inserted into the first column to the fourth column in the subtrahend and minuend matrixes so as to perform a fixed-point addition. As a result, the two matrixes will have a value of 7×15. Finally, a single row is added to add c to it. The results are two 8×15 matrixes.

Though it may be considered as a matrix subtraction of [Equation 7], it can be understood as a binary subtraction having figure numbers of 15 bits in each of the row. Let the first column take as an example, a binary number of 19 bits each can be considered, considering a fixed-point addition. The first row is [0000 z1 z0000 . . . 00]–[00000 0 z14 z13 . . . z3 z2]. At this time, let the minuend be A and the subtrahend be B, the first row may be expressed as A18:0–B18:0. Also, if L18:0 has 1 at the place of z0 of A18:0 as it is [0 . . . 0 10 . . . 0], A18:0–B18:0 can be expressed into A18:0–L18:0–B18:0+L18:0.

In case of A18:0–L18:0, 1 is subtracted from the z0 place of A18:0. For the purpose of hardware embodiment, the method such as in FIG. 1 is used. As shown in FIG. 1, if the method is sequentially applied from the z0 place of A18:0 to the first column, respective figure number before 1 at the rightest place of A18:0 is remained intact and then all the bits to z0 therefrom are bit-wised inversed, thereby a new vector of A'18:13 is obtained. It can be easily understood that L18:0–B18:0 is calculated to become 2's complement of B18:0.

The 1's compliment of B18:0 is first calculated. As a result, a new vector of B'12:0 is also obtained. Using A'18:13 and B'12:0 obtained above, the result in which subtraction is performed for respective columns can be obtained. When this method is applied to respective columns, a 7×19 matrix from which subtraction is performed can be obtained. Then, a single column is added to the 7×19 matrix obtained to add c to it. In the above, the value in which a subtraction is performed from the matrix takes a 1's complement instead of a 2's complement. Therefore, as the value is smaller 1 than the actual value, the value of c+7 is located at the added column.

As a result, a matrix of 8×19 for which an operation of "(a z+c)mod M" is performed, can be obtained. In order to embody the 8×19 matrix into a hardware, it is designed to perform an addition for respective columns. For the purpose of hardware embodiment, when considering that a carry is generated, it may be expressed into the following [Equation 8]:

$$a_{m-1:0} + b_{m-1:0} = s_{m-1:0} - d_m \quad \text{[Equation 8]}$$

Therefore, from the addition results, as more than 20 bits figure numbers indicate a symbol, it may be disregarded and therefore 15–19 bits are subtracted from it, considering it as a carry. With reference to FIG. 3 which is applicable to the minuend portion, inputs I0, 01 of the block each become 01 shifted (from the left column) with one bit of the minuend.

Figure 4:
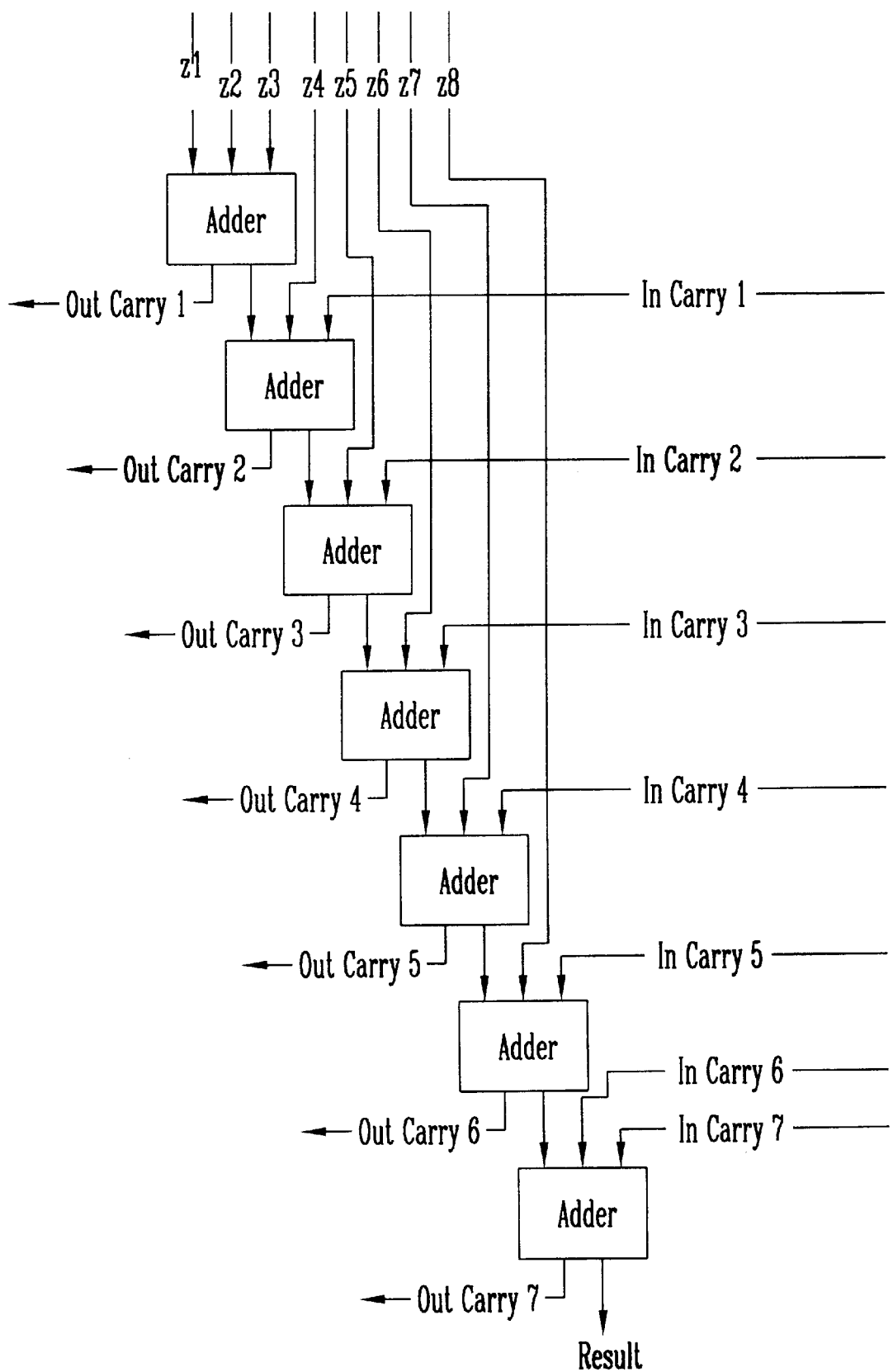
FIG. 4 shows additions on a column basis.

These I0, I1 inputs are used to make 01 and 02 which are to be shifted toward the next (left) column and toward the output, respectively. These blocks are continually applied from the bit at which z0 is located toward the left by one bit. Therefore, the acting effect can be obtained by which 1 is subtracted from z0 of the subtrahend portion. To the subtrahend portion is again added 1 which is subtracted from the minuend portion using a bit-wise version. Since the result obtained thus is smaller 1 than to perform a 2's complement subtraction, it is compensated in the process of adding the constant c to it. 02s which are obtained by applying the block shown in FIG. 2 are sequentially arrayed in the minuend portion and then the bit-wises of inverse subtrahend portion is attached to the lower bits thereof, thereby producing the value less 1 than 2's complement subtraction of respective rows. When applying the above method to the respective rows, a matrix of 7×15 can be obtained and is added by the constant c by adding a single row thereto. Thus completed 8×15 matrix produces the output of 19 bits through respective additions on a column basis, as shown in FIG. 4 and the 19–15 bits are again added in the lower bits, considering it as a carry. Using this method, it can accomplish the effects of shortening a delay time close to 2 times and a hardware usage compared to the first method, as shown in Table 1.

TABLE 1

|  | Hardware Usage | Maximum Delay Time |
| --- | --- | --- |
| First Method | 205 cells | 191 cells |
| The method of Present Invention | 218 ns | 122 ns |

From the foregoing, the present invention provides the advantages in that it can improve the speed of almost 2 times compared to the result obtained using the conventional method, while reducing the hardware usage compared to the conventional method. While the present invention has been described and illustrated herein with reference to the preferred implementation thereof, it will be understood by those skilled in the art that various changes in form and details may be made therein without departing from the spirit and scope of the invention.

The foregoing description, although described in its preferred implementation with a certain degree of particularity, is only illustrative of the principles of the present invention. It is to be understood that the present invention is not to be limited to the preferred implementations disclosed and illustrated herein. Accordingly, all expedient variations that may be made within the scope and the spirit of the present invention are to be encompassed as further implementations of the present invention.

What is claimed is:

1. A method of efficiently embodying a randomizer, comprising the steps of:

performing a series of matrix operations of equations 1 to 4 for embodying a modulo $2^m+1$ operations;

performing a matrix subtraction using bitwise inversion and binary additions of equation 5, reducing 1 from the lowest bit for each row of the minuend matrix, and adding 1 to the highest bit for each row of the subtrahend matrix, to produce a 7×19 matrix; and adding the 7×19 matrix to the value obtained by adding 7 to the constant c, to produce a 8×19 matrix, wherein said equations 1 to 5 are as follows:

$$\begin{array}{c} z_{14}\ z_{13}\ z_{12}\ \cdots\ z_7\ z_6\ \cdots\ z_1\ z_0 \\ x)\quad a_{13}\ a_{12}\ \cdots\ a_7\ a_6\ \cdots\ a_1\ a_0 \\ \hline z_{14}\ z_{13}\ z_{12}\ z_{11}\ z_{10}\ \cdots\ z_1\ z_0\ 0\ 0 = Y1 \\ z_{14}\ z_{13}\ z_{12}\ z_{11}\ z_{10}\ \cdots\ z_1\ z_0\ 0\ 0\ 0 = Y2 \\ \cdots \\ +)\ z_{14}\ z_{13}\ \cdots\ z_0\ 0\ 0\ 0\ \cdots\ 0\ 0 = Y7 \end{array} \quad \{\text{Equation 1}\}$$

$$\begin{vmatrix} Y7 \\ \cdots \\ Y2 \\ Y1 \end{vmatrix} = \begin{vmatrix} z_{14}\ z_{13}\ \cdots\ \cdots\ z_1\ z_0\ 0\ \cdots\ 0\ 0\ 0\ 0\ 0 \\ \cdots\ \cdots\ \cdots\ \cdots\ \cdots\ \cdots\ \cdots \\ z_{14}\ z_{13}\ z_{12}\ z_{11}\ z_{10}\ \cdots\ z_1\ z_0\ 0\ 0\ 0 \\ z_{14}\ z_{13}\ z_{12}\ z_{11}\ \cdots\ \cdots\ z_1\ z_0\ 0\ 0 \end{vmatrix} \quad \{\text{Equation 2}\}$$

$$\begin{aligned} <Y>\bullet w_{27:0} &= C\bullet w_{12:0}\bullet 2^{15}+D\bullet w_{14:0} \\ &= C\bullet w_{12:0}\bullet 2^{15}+C\bullet w_{12:0}-C\bullet w_{12:0}+D\bullet w_{14:0} \\ &= (C\bullet w_{12:0})\bullet M-C\bullet w_{12:0}+D\bullet w_{14:0} \end{aligned} \quad \{\text{Equation 3}\}$$

$$\begin{aligned} a\bullet z\bmod M &= [1111111]\bullet(D\bullet w_{14:0}-C\bullet w_{12:0}) \\ &= [1111111]\bullet(D-[0C])\bullet w_{14:0} \end{aligned} \quad \{\text{Equation 4}\}$$

$$D-[0\ C] \quad [\text{Equation 5}]$$

$$\begin{vmatrix} z_1 & z_0 & 0 & \cdots & \cdots & \cdots & \cdots & \cdots \\ \cdots & \cdots & \cdots & \cdots & \cdots & \cdots & \cdots & \cdots \\ z_{11} & z_{10} & \cdots & z_1 & z_0 & \cdots & \cdots & \cdots \\ z_{12} & z_{11} & \cdots & z_2 & z_1 & z_0 & 0 & 0 \end{vmatrix} + \begin{vmatrix} 0 & 0 & -z_{14} & -z_{13} & \cdots & \cdots & -z_3 & -z_2 \\ \cdots & \cdots & \cdots & \cdots & \cdots & \cdots & \cdots & \cdots \\ 0 & \cdots & \cdots & \cdots & 0 & -z_{14} & -z_{13} & -z_{12} \\ 0 & & & & & 0 & -z_{14} & -z_{12} \end{vmatrix}.$$

\* \* \* \* \*